Patented Sept. 28, 1948

2,449,991

UNITED STATES PATENT OFFICE 2,449,991

PREPARATION OF BETA-AROXY CARBOXYLIC ACIDS

Thomas L. Gresham and Forrest W. Shaver, Akron, Ohio, assignors to The B. F. Goodrich Company, New York, N. Y., a corporation of New York No Drawing. Application October 5, 1945, Serial No. 620,659

18 Claims. (Cl. 260—520)

This invention relates to the preparation of beta-aroxy carboxylic acid compounds, and pertains more specifically to the preparation of such compounds by the reaction of a phenol and a beta-lactone.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydrocrylic acid lactone) which has the structure

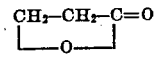

is economically obtained from ketene and formaldehyde.

We have now discovered that beta-propiolactone, and also the other beta-lactones, will react with phenols, that is compounds containing a hydroxy group directly attached to an aromatic nucleus, to form beta-aroxy carboxylic acids; and that this reaction provides a convenient and economical route to numerous useful organic compounds many of which have not heretofore been prepared or have been obtained only with difficulty and/or from relatively costly raw materials.

This reaction proceeds, in general, as represented by the following equation:

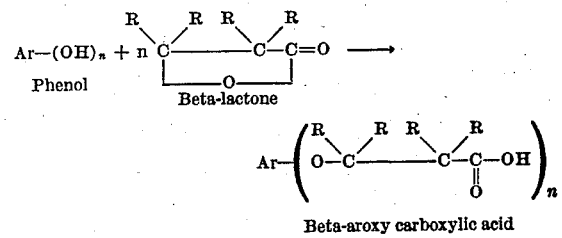

where Ar represents an aromatic radical either substituted or unsubstituted, having its connecting valence on a nuclear carbon atom; $n$ is an integer corresponding to the number of hydroxyl groups in the phenol; and R represents hydrogen or a substituent radical.

In carrying out the reaction, the reactants are brought into contact with one another, preferably in a medium having a pH of about 7 or above, in any desired manner, the precise condition not being critical. Thus simply by mixing the phenol and the lactone and refluxing the mixture in the absence of added materials, or in the presence of an inert solvent or diluent such as benzene, it is possible to obtain the desired beta-aroxy carboxylic acid. Higher yields, however, are generally secured by employing a polar solvent for the reactants such as water and carrying out the reaction in the presence of an inorganic base such as an alkali metal hydroxide or ammonium hydroxide. When the reaction is effected in this way it is preferable first to add the base to a solution of the phenol to form a solution of a phenolate and then to add the beta-lactone to this solution, the phenolate reacting with the beta-lactone to produce a salt of the beta-aroxy carboxylic acid, from which the free acid is liberated on addition of mineral acid to the solution.

As indicated by the equation, one molecular proportion of beta-lactone for each molecular proportion of hydroxyl present in the phenol is theoretically required for the reaction and substantially this amount is preferably employed, but an excess of either of the reactants may be used if desired. Similarly, the amount of base, if such a material is used, is preferably chemically equivalent to the hydroxyl of the phenol or, if desired, is in excess of this amount. When the reaction yields, as the initial product, a solution of a salt of the beta-aroxy carboxylic acid, this carboxylic acid salt may react with excess beta-lactone in the manner described in the copending application of Thomas L. Gresham and Jacob Eden Jansen, Serial No. 620,655, filed October 5, 1945, but this side reaction does not occur to any appreciable extent so long as there remains any unreacted phenol or phenolate, and hence does not introduce any substantial complications.

Other conditions for the reaction such as temperature and pressure are not critical and may be varied widely. Highest yields of the desired product are generally secured when working at temperatures from 0 to 100° C., preferably from 0 to 50° C., and at atmospheric pressure. The most convenient temperature, especially when the reaction is carried out in aqueous solution, is from about 20 to 50° C., since the reaction is exothermic and this temperature is maintained without appreciable heating or cooling of the solution. Temperatures as low as −20° C. or lower or as high as 200° C. or even higher, however, are also operable.

Any desired phenol may be used to react with the beta-lactone. Unsubstituted phenols, which contain only carbon, hydrogen and oxygen and have all the oxygen present in phenolic hydroxyl groups, including monohydric unsubstituted phenols such as phenol itself, cresols, xylenols, o, m and p-hydroxy styrenes, cumenol, naphthols, mono-hydroxy diphenyls, mono-hydroxy naphthalenes, mono-hydroxy anthracenes, mono-hydroxy di- and triphenyl methanes and the like; and polyhydric unsubstituted phenols such as hydroquinone, resorcinol, pyrocatechol, phloroglucinol, pyrogallol, p-tert-butyl catechol, polyhydroxy diphenyls, naphthalenes and anthracenes, alkylidene bis phenols and the like, may all be used. Substituted phenols analogous to the above phenols but containing in the aromatic residue attached to hydroxyl elements other than carbon and hydrogen present in substituent groups including those which are essentially unreactive in character such as chloro, bromo, iodo, nitro, oxy, cyano, keto, azo, nitrilo, thio, thiono, sulfonyl and the like as well as those which contain reactive hydrogen atoms such as amino, mercapto, carboxyl and the like, attached either to the aromatic nucleus or to a side chain, are also contemplated as the material to be reacted with the beta-lactone. In fact higher yields of beta-(aromatic-oxy) carboxylic acids are generally secured when the phenol used contains one or more substituents free from reactive hydrogen atoms, such as halogen atoms (preferably chlorine) nitro groups and oxy groups, directly attached to the aromatic nucleus. The presence in the phenol of substituents containing reactive hydrogen, however, complicates the reaction since these may also react with the beta-lactone, and hence it is preferable that they not be present. Typical examples of substitued phenols which may be used are set forth in the following list:

o-Chlorophenol
p-Chlorophenol
2,4-dichlorophenol
Pentachlorophenol
2,6-dichloro-4-nitrophenol
2,4-diiodophenol
p-Bromophenol
m-Nitrophenol
o-Methoxyphenol
p-Octyloxyphenol
2-methoxy-4-methylphenol
2,4-dichloro-1-naphthol
2-aceto-1-naphthol
1-nitroso-2-naphthol
1,2-dihydroxy-4-chlorobenzene
1,4-dihydroxy-2,3-dichlorobenzene
5-chloro-2,3-dicyanohydroquinone
1,4-dihydroxy-2,3-dichloro-naphthalene
Pyrogallol monoacetate
3-chloro-4,4'-dihydroxy diphenyl
3,5,3',5', tetrabromo-4,4'-dihydroxydiphenyl
2,2' dihydroxy diphenyl ether
Bis(2-hydroxy naphthyl-1) sulfide
4,4' dihydroxydiphenyl disulfide
4,4' dihydroxydiphenyl sulfoxide
2,5-dihydroxydiphenyl sulfone
4,4' dihydroxy - 3,5,3',5' - tetrachlorodiphenyl methane
Bis(4 - hydroxy - 2,6 - dimethyl - 3 - methoxyphenyl) methane
Bis(3-chloro-4-hydroxyphenyl) dimethyl methane
4,4' dihydroxy-3,5,3',5'-tetrabromostilbene
1,2-dihydroxy anthraquinone
o-Azophenol
p-Aminophenol
Salicyclic acid
4,4'- dihydroxydiphenyl amine
2,3-dihydroxy terephthalic acids and esters thereof
3,5-dinitro-2,4-dihydroxy benzoic acid and esters thereof
Phenolphthalein
1-phenol-2-sulfonic acid
M-diethylaminophenol
o-Anilinophenol
p-Hydroxybenzophenone
2,3,4-trihydroxybenzophenone Thiophenols corresponding to the unsubstituted and substituted phenols described above also react with beta-lactones in a similar manner, as is described and claimed in the copending application of Thomas L. Gresham and Forrest W. Shaver, Serial No. 620,660, filed October 5, 1945.

Beta-propiolactone, the simplest possible beta-lactone, is the preferred beta-lactone for use in this invention because of its low cost, and the ease with which it reacts with phenols to produce beta-aroxy propionic acid compounds. However, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha - ethyl - beta - propiolactone, alpha - isopropyl - beta - propiolactone, alpha-butyl-beta-propiolactone, alpha-methyl-beta - butyrolactone, alpha-ethyl-beta-butyrolactone, beta-methyl-beta-valerolactone and the like may also be used, as may other beta-lactones, to produce numerous other beta-aroxy carboxylic acid compounds. Other known beta-lactones include lactones of beta-hydroxy-monocarboxylic acids containing cycloalkyl, aryl and aralkyl substituents such as beta-cyclohexyl-beta-propiolactone, beta-phenyl-beta-propiolactone, alphaphenyl - beta - propiolactone, beta - benzyl-beta-propiolactone and the like, all of which, like beta-propiolactone and its homologs, are of the general structure

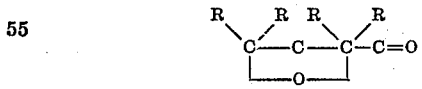

wherein R is hydrogen or an unreactive hydrocarbon group (i. e., a hydrocarbon group free from aliphatic unsaturation) and may be prepared in the manner described in the above-mentioned Küng patent. Still other known beta-lactones include lactones of unsaturated beta-hydroxy carboxylic acids, mono-beta lactones of dicarboxylic acids and dilactones of dicarboxylic acids in which at least one of the lactones is beta, examples of which are alpha, alpha-dimethyl-beta-propiolactone - beta - carboxylic acid; trimethyl - beta-propiolactone-beta-carboxylic acid; beta, beta-dimethyl - beta - propiolactone - alpha - carboxylic acid; trimethyl - beta - propiolactone-alpha-carboxylic acid and the beta-delta- dilactone of citrylidene malonic acid, all of which like the beta-lactones before mentioned are composed exclusively of hydrogen, carbon and carbonoxy

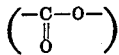

oxygen atoms. In addition to these compounds other compounds containing the structure

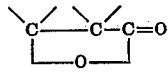

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta-nitrophenyl-beta-propiolactone; beta (O-nitro-m-chlorophenyl)-beta-propiolactone; beta (O - nitro - m - methoxyphenyl) - beta - propiolactone; alpha - hydroxy - beta - phenyl - beta-propiolactone and alpha-bromo-beta, beta-dimethyl-beta-propiolactone-alpha-carboxylic acid.

Thus, any of the generic class of beta-lactones may be used in the practice of this invention. When the reaction is carried out in aqueous solution, as is preferred, beta-lactones which are soluble in water (those beta-lactones containing no more than about six carbon atoms possess this property) are of course used.

As has been indicated hereinabove, the reaction described enables numerous useful organic compounds to be produced more readily and more economically than has heretofore been possible. Many of the beta-aroxy propionic acids of the formula $$Ar-O-CH_2CH_2C-OH$$
$$\parallel$$
$$O$$

wherein Ar is an aryl radical, a halogenated aryl radical or an alkoxy aryl radical (which are obtained from beta-propiolactone and monohydric phenols) are useful as plant hormones, growth stimulants and for similar purposes. The beta-aryloxy propionic acids may also be heated with phosphoric acid or other dehydrating agents to close the heterocyclic ring and thereby produce 4-chromanone and its derivatives.

The beta-aroxy polycarboxylic acids which contain an aroxy radical in beta position to each of a plurality of carboxyl groups and are prepared by the reaction of one molecule of a polyhydric phenol with a number of beta-lactone molecules equal to the number of hydroxyl groups in the polyhydric phenol, are useful as plasticizers for resinous and rubbery materials such as cellulose derivatives, vinyl resins, synthetic rubber and the like. Esters of these acids, which may be obtained by esterification of the acid in the conventional manner or by employing an alcohol as the solvent for the reaction between the beta-lactone and phenol are likewise useful for this purpose. Unsaturated alcohol esters such as the diallyl esters are also useful polymerizable materials. Of these compounds, those which possess the formula:

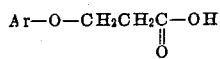

wherein Ar is a divalent aromatic radical, preferably an arylene hydrocarbon radical or a halogenated arylene radical, having each of the connecting valences directly attached to the aromatic ring, A is an alkylidene radical and X is hydrogen (when the compounds are acids) or an alcohol radical (when the compounds are esters of these acids) are particularly valuable materials. Such compounds are obtained from an alkylidene bis-phenol and beta-propiolactone.

In order further to illustrate the invention the following specific examples are set forth but it is to be understood that the invention is not limited thereto. Unless otherwise indicated all parts are by weight.

*Example 1*

36 parts of beta-propiolactone are added to 47 parts of phenol, and the mixture is refluxed for about 10 hours. The reaction mixture is then extracted with hot water leaving a heavy oil. This oil is distilled at reduced pressure and yields 32.6 parts (39%) of beta-phenoxy propionic acid (B. P. 188–89° C./26 mm.; M. P. 97–98° C.).

*Example 2*

In 100 volumes of benzene (87.9 parts by weight), 94 parts of phenol are dissolved and the solution heated to reflux temperature. 72 parts of beta-propiolactone are added and refluxing continued for about 8 hours. On distilling the reaction mixture a fraction consisting of 24.5 parts of B-phenoxy propionic acid is obtained.

*Example 3*

An aqueous sodium hydroxide solution is prepared by dissolving 40 parts of the base in 200 parts of water and this solution is added to 94 parts of phenol. The resulting solution is cooled to about 20° C. and 72 parts of beta-propiolactone are added with stirring of the solution and while maintaining the temperature at 20–30° C. Stirring at this temperature is continued for about an hour after addition of the lactone; concentrated hydrochloric acid is then added to acidify the solution whereupon an oil separates. This oil is extracted from the aqueous layer with ether and, after removal of the ether, is distilled under reduced pressure and crystallized from methanol solution by addition of water to yield about 20 parts of B-phenoxy propionic acid.

*Example 4*

129 parts of ortho-chlorophenol are added to a solution of 40 parts of sodium hydroxide in 200 parts of water, 72 parts of beta-propiolactone are slowly added with stirring, the temperature of the solution being from 25–30° C. The reaction mixture is stirred for about 2 hours at this temperature, acidified, and then concentrated by distilling off part of the water whereupon a product precipitates in the form of white plates. This product is filtered from the solution, recrystallized from methanol and water, and identified as beta-O-chlorophenoxy propionic acid M. P. 109–111° C. The yield is 80%.

*Example 5*

Example 4 is repeated using p-chlorophenol in place of O-chlorophenol. Beta-p-chlorophenoxy propionic acid, M. P. 135–136° C., is similarly obtained.

*Example 6*

Example 4 is again repeated using an equal molecular proportion of 2,4-dichlorophenol. A 78% yield of beta-2,4-dichlorophenoxy propionic acid, M. P. 92-93° C., which is an excellent plant growth promoter, is produced.

*Example 7*

A solution containing 4 parts of sodium hydroxide in 100 parts of water is mixed with 14 parts of ortho-nitrophenol. 7.5 parts of beta-propiolactone dissolved in 10 parts of water are added and the mixture stirred for 2-4 hours at a temperature of 20-40° C. The solution is then acidified with hydrochloric acid and the oil which separates out is extracted with ether. The ether layer is extracted twice with sodium bicarbonate solution and the aqueous extract acidified whereupon an oil is obtained which crystallizes on cooling. The crystals are filtered; recrystallized from methanol and water, and identified as beta-O-nitrophenoxy propionic acid, M. P. 120-122° C.; yield 48%. When m-nitro and p-nitrophenol are used in place of the O-nitro compound the corresponding beta-nitrophenoxy propionic acids are similarly obtained.

*Examples 8 to 10*

The procedure of Example 7 is three times repeated using in place of ortho-nitrophenol, an equivalent quantity of beta-naphtol, m-cresol, and o-methoxyphenol, respectively. Beta(-2-naphthoxy propionic acid (M. P. 140-143° C.); beta-(m-cresoxy propionic acid (M. P. 100-103° C.) and beta-(O-methoxy-phenoxy) propionic acid (M. P. 136-137° C.) are thereby secured in good yields.

*Example 11*

An aqueous solution containing 40 parts of sodium hydroxide is dissolved in 200 parts of water and mixed with 150 parts of bis(3-chloro-4-hydroxy phenyl) dimethyl methane. 72 parts of beta-propiolactone are slowly added to the resulting solution with stirring at about 25° to 50° C., the addition requiring about one hour. The mixture is then stirred for an additional hour at 80° C. after which carbon dioxide is passed into the solution and the solution extracted with ethyl acetate to remove the unreacted dihydric phenol. The aqueous layer is made acid and extracted with ether and the ether removed leaving an impure residue. This residue is made alkaline with aqueous sodium hydroxide and concentrated by removal of water under vacuum. On addition of acetone and methyl alcohol a solid results which is filtered and acidified to yield a clear white viscous oil soluble in benzene and chloroform but insoluble in water. The oil is identified as bis(3-chloro-4-betacarboxyethoxyphenyl) dimethyl methane which results from the reaction set forth in the following equation:

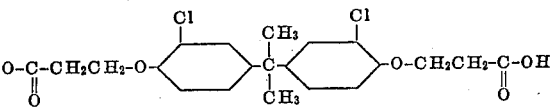

The compound obtained in this example, which is representative of compounds of the structure

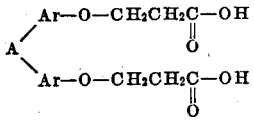

wherein Ar is a divalent aromatic radical having its two connecting valences on nuclear carbon atoms and A is an alkylidene radical, is a plasticizer for various resinous and rubbery materials. Esters of this acid including those with monohydric alcohols such as ethanol, 2-ethylhexanol, lauryl alcohol, benzyl alcohol, ethylene glycol mono-butyl ether and the like as well as those with polyhydric alcohols such as ethylene glycol are also viscous oils useful as plasticizers particularly for vinyl resins such as polyvinyl chloride. In addition, the diallyl ester may be polymerized to yield valuable thermosetting resins.

Numerous modifications and variations of the invention will be obvious to those skilled in the art and are within the spirit and scope of the appended claims.

We claim:

1. Bis (3-chloro-4-beta-carboxyethoxyphenyl) dimethyl methane.

2. The method which comprises bringing a water-soluble saturated aliphatic beta-lactone into efficient contact with a material of the class consisting of (1) a phenol alone, (2) a solution of a phenol in an inert solvent, and (3) an aqueous solution containing a dissolved water-soluble salt of a phenol, whereby to effect a chemical reaction and then recovering from the reaction mixture a beta-aromatic-oxy carboxylic acid compound formed by the chemical reaction.

3. The method which comprises bringing beta-propiolactone into efficient contact with a material of the class consisting of (1) a phenol alone, (2) a solution of a phenol in an inert solvent, and (3) an aqueous solution containing a dissolved water-soluble salt of a phenol, whereby to effect a chemical reaction and then recovering from the reaction mixture a beta-aromatic-oxy propionic acid compound formed by the chemical reaction.

4. The method which comprises preparing a reaction mixture comprising a water-soluble saturated aliphatic beta-lactone and a phenol, maintaining the mixture in a state of agitation at a temperature in the range of −20 to 200° C. and at a pH not less than that of a mixture containing only the said phenol and the said lactone, whereby to effect a chemical reaction between the phenol and lactone and recovering from the reaction mixture a beta-aromatic-oxy carboxylic acid formed by the chemical reaction.

5. The method which comprises preparing a mixture comprising beta-propiolactone and a phenol, maintaining the mixture in a state of agitation at a temperature in the range of −20 to 200° C. and at a pH not less than that of a mixture containing only the said phenol and the said lactone, whereby to effect a chemical reaction between the phenol and lactone and recovering from the reaction mixture a beta-aromatic-oxy propionic acid formed by the chemical reaction.

6. The method which comprises preparing a mixture comprising a water-soluble saturated aliphatic beta-lactone and a phenol of the formula Ar(OH)$_n$ wherein Ar is an aromatic radical in which all the hydrogen atoms are connected to carbon atoms and having each connecting valence on a nuclear carbon atom and $n$ is an integer from 1 to 3, maintaining the mixture in the state of agitation at a temperature of −20 to 100° C. and at a pH not less than that of a mixture containing only the said phenol and the said lactone, whereby to effect chemical reaction between the phenol and lactone, and recovering from the reaction mixture a beta-aromatic-oxy carboxylic acid formed by the chemical reaction.

7. The method which comprises preparing a reaction mixture comprising beta-propiolactone and a phenol of the formula Ar(OH)$_n$ wherein Ar is an aromatic hydrocarbon radical having each connecting valence on a nuclear carbon atom and $n$ is an integer from 1 to 3, maintaining the mixture in a state of agitation at a temperature of —20 to 200° C. and at a pH not less than that of a mixture containing only the said phenol and beta-propiolactone whereby to effect chemical reaction between the phenol and beta-propiolactone and recovering from the reaction mixture the compound thus formed of the formula

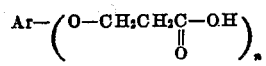

wherein Ar and $n$ have the same meaning as above.

8. The method of claim 7 wherein the phenol of the formula Ar(OH)$_n$ is phenol itself,

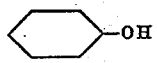

and the compound recovered is beta-phenoxy propionic acid.

9. The method which comprises dissolving a phenol in an aqueous solution of an inorganic base to form an aqueous solution of a water-soluble salt of the phenol, admixing a water-soluble saturated aliphatic beta-lactone with the said aqueous solution, maintaining the resulting mixture in a state of agitation and under conditions of temperature and pressure such that the mixture is in liquid condition, acidifying the solution and separating the beta-aromatic-oxy carboxylic acid thus formed.

10. The method which comprises dissolving a phenol in an aqueous solution of a water-soluble inorganic base to form an aqueous solution of a water-soluble salt of the phenol, admixing beta-propiolactone with the said aqueous solution, maintaining the mixture in a state of agitation and under conditions of temperature and pressure such that the mixture is in the liquid condition, acidifying the solution and recovering the beta-aromatic-oxy propionic acid thus formed.

11. The method which comprises dissolving a phenol of the formula Ar(OH)$_n$ wherein Ar is an aromatic radical in which all the hydrogen atoms are attached to carbon atoms and having each connecting valence on a nuclear carbon atom and $n$ is an integer from 1 to 3, in an aqueous solution of an alkali metal hydroxide to form an aqueous solution of an alkali metal salt of the phenol, adding beta-propiolactone to the said aqueous solution with agitation under atmospheric pressure and at a temperature of about 0° to 100° C., acidifying the mixture and separating the resulting compound of the formula

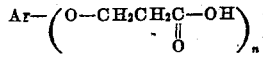

wherein Ar and $n$ have the same meaning as above.

12. The method which comprises dissolving a phenol composed exclusively of carbon, hydrogen and oxygen atoms and having all its oxygen atoms in oxy groups, in an aqueous solution of an alkali metal hydroxide to form an aqueous solution of an alkali metal salt of the said phenol, adding beta-propiolactone to the said aqueous solution with agitation under conditions of temperature and pressure such that the resulting mixture is maintained in the liquid condition, acidifying the mixture and separating the beta-aromatic-oxy propionic acid thus formed.

13. The method which comprises dissolving a phenol of the formula Ar(OH)$_n$ wherein Ar is an aromatic hydrocarbon radical containing less than 20 carbon atoms and having each connecting valence on a nuclear carbon atom in an aqueous solution of an alkali metal hydroxide to form an aqueous solution of an alkali metal salt of the said phenol, adding beta-propiolactone to the said aqueous solution with agitation at atmospheric pressure and at a temperature of about 0 to 100° C., acidifying the solution and separating the resulting compound of the formula

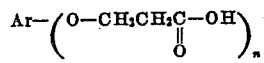

wherein Ar and $n$ have the same meaning as above.

14. The method of claim 13 wherein the phenol of the formula Ar(OH)$_n$ is a monohydroxy benzene.

15. The method of claim 13 wherein the phenol of the formula Ar(OH)$_n$ is phenol itself

and the compound separated is beta-phenoxy propionic acid.

16. The method which comprises dissolving a phenol of the formula Cl-Ar-OH wherein Cl-Ar represents a chlorinated aromatic hydrocarbon radical, in an aqueous solution of an alkali metal hydroxide to form an aqueous solution of an alkali metal salt of the said phenol, adding beta-propiolactone to the said aqueous solution with agitation at atmospheric pressure and at a temperature of about 0 to 100° C., acidifying the solution and separating the beta(chloro-aroxy) propionic acid thus formed.

17. The method of claim 16 wherein the phenol is 2,4-dichloro phenol and the compound recovered is beta(2,4-dichloro-phenoxy) propionic acid.

18. The method which comprises dissolving an alkylidene bis-phenol in an aqueous solution of an alkali metal hydroxide to form an aqueous solution of an alkali metal salt of the bis-phenol, adding beta-propiolactone to the said aqueous solution with agitation at atmospheric pressure and at a temperature of about 0 to 100° C., acidifying the solution and separating the compound thus formed.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,083,482 | Steindorff et al. | June 8, 1937 |
| 2,198,293 | Reiff et al. | Apr. 23, 1940 |
| 2,322,761 | Lontz | June 29, 1943 |

(Other references on following page)

FOREIGN PATENTS

| Number | Country | Date |
|--------|---------|------|
| 670,357 | Germany | Jan. 17, 1939 |

OTHER REFERENCES

Fittig et al., Liebig's Annalen, vol. 267, pages 191–203 (1891).

Fittig et al., Liebig's Annalen, vol. 226, pages 326–347 (1884).

Wislicenus, Liebig's Annalen, vol. 233, pages 101–116 (1886).

Blaise, Compt. rendus (Fr. Acad. Sci.) vol. 124, pages 89–90 (1897).

Blaise, Bull. Soc. Chim. de France (3), vol. 29, pages 335–336 (1903).

Blanc, Bull. Soc. Chim. de France (3), vol. 33, pages 886–890 (1905).

Wohlgemuth, Compt. rendus, vol. 158, pages 1577–1578 (1914).

Johansson, Berichte (Deutsch. Chem. Gesell), vol. 48, pages 1262–1266 (1915).

MacArdle, Solvents in Synthetic Org. Chem. (1925), pages 1–3.

Spencer et al., Jour. Am. Chem. Soc., vol. 63, pages 1281–1285 (1941).

Certificate of Correction

Patent No. 2,449,991. September 28, 1948.

THOMAS L. GRESHAM ET AL.

It is hereby certified that error appears in the printed specification of the above numbered patent requiring correction as follows:

Column 4, lines 54 to 58 inclusive, for and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.*